(12) United States Patent
Lin

(10) Patent No.: US 6,595,116 B1
(45) Date of Patent: Jul. 22, 2003

(54) COOKING DEVICE

(75) Inventor: Yu-Yuan Lin, Tainan (TW)

(73) Assignee: Uni-Splendor Corp., Tainan (TW)

( * ) Notice: Subject to any disclaimer, the term of this patent is extended or adjusted under 35 U.S.C. 154(b) by 0 days.

(21) Appl. No.: 10/314,527

(22) Filed: Dec. 9, 2002

(51) Int. Cl.[7] .......................... A47J 37/00; A47J 37/04; A47J 37/06; A47J 37/10; A23L 1/00
(52) U.S. Cl. ............................ 99/349; 99/353; 99/372; 99/375; 99/378; 99/379; 99/400; 99/425; 99/446
(58) Field of Search ..................... 99/331–333, 349, 99/352, 353, 372–384, 400, 401, 422–425, 444–450; 219/401, 521, 524, 525, 585, 586, 537, 415, 461, 492, 494; 100/92, 305; 126/369, 20; 426/523, 520, 512

(56) References Cited

U.S. PATENT DOCUMENTS

| | | | | |
|---|---|---|---|---|
| 3,880,064 A | * | 4/1975 | Martinex ...................... | 99/349 |
| 4,150,609 A | | 4/1979 | McClean | |
| 4,972,766 A | * | 11/1990 | Anetsberger .................. | 99/332 |
| 5,473,976 A | * | 12/1995 | Hermansson ................. | 99/349 |
| 5,531,155 A | * | 7/1996 | Pellicane et al. .............. | 99/372 |
| 5,555,794 A | * | 9/1996 | Templeton et al. ............ | 99/349 |
| 5,655,434 A | * | 8/1997 | Liebemann .................... | 99/353 |
| 5,676,046 A | * | 10/1997 | Taber et al. .................... | 99/340 |
| 5,755,150 A | * | 5/1998 | Matsumoto et al. ........... | 99/372 |
| 5,771,782 A | * | 6/1998 | Taber et al. ............... | 99/385 X |
| 5,802,958 A | * | 9/1998 | Hermansson ............. | 99/379 X |
| 5,839,359 A | * | 11/1998 | Gardner ........................ | 99/349 |
| 5,881,634 A | * | 3/1999 | Newton ..................... | 99/379 X |
| 6,310,326 B1 | * | 10/2001 | Wang ........................ | 99/372 X |

\* cited by examiner

Primary Examiner—Timothy F. Simone
(74) Attorney, Agent, or Firm—Alan D. Kamrath; Rider Bennett, LLP

(57) ABSTRACT

A cooking device comprises two L-shaped supports, a lower cooking plate on the supports, an upper cooking plate matingly engaged with the lower plate and including a hollow protrusion at either side, a handle pivotably secured to the supports and including two first side slots, two sliding members inserted through the first slots and the protrusions for pivotably securing the upper plate to the handle and being adjustable for taking account of variations in thickness of steaks, and a second side slot adjacent one first slot, and a fastening mechanism secured to the handle. The device further guides oil drops formed by the thoroughly cooked steaks to flow from the pivoted, slanted upper plate to the lower plate, and is capable of standing upright for saving storage.

2 Claims, 5 Drawing Sheets

COOKING DEVICE

FIELD OF THE INVENTION

The present invention relates to cooking appliances and more particularly to an improved small cooking device intended for grilling steaks or the like.

BACKGROUND OF THE INVENTION

Cooking appliances are well known. For example, in U.S. Pat. No. 4,150,609 there is disclosed a cooking apparatus wherein a cooking plate is in intimate contact with an adjacent heat sink so that there is an effective transfer of heat from respective heating elements to the respective cooking plates. However, a number of factors such as steaks having different thickness, storage convenience in a storage position, and oil dropping out of the well-done steak are not fully solved or even totally not addressed by the patent. Thus, continuing improvements in the field of cooking appliances are constantly being sought.

SUMMARY OF THE INVENTION

It is therefore an object of the present invention to provide a cooking device comprising two substantially L-shaped supports each including a horizontal section and a vertical section including an outward hollow, cylindrical staged member; a lower cooking plate having a shape of parallelepiped, the lower cooking plate being releasably secured to the supports and including a plurality of electric heating elements, a top flat surface with a peripheral wall formed therearound, and a peripheral flange for enclosing its underside; an upper cooking plate having a shape of parallelepiped, the upper cooking plate being matingly engaged with the top flat surface and including a plurality of electric heating elements and a hollow protrusion at either side; a handle shaped as an n and including two hollow cylinders pivotably secured to the outward hollow, cylindrical staged member, two first elongate slots at the sides, two pin-shaped sliding members each loosely inserted through the first elongate slot and the hollow protrusion so as to pivotably secure the upper cooking plate to the handle, and a second elongate slot at the same side as one of the first elongate slots; and a fastening mechanism including latch means at its upper portion inserted into the second elongate slot for fastening the fastening mechanism and the handle together, and a lower hook, wherein each sliding member is either slid to one end of the first elongate slot when a plurality of thin steaks are placed between the plates or slid to the other end of the first elongate slot when a plurality of thick steaks are placed between the plates so that the underside of the upper cooking plate is capable of being in intimate contact with the steaks for effectively transferring heat from the heating elements of the plates to the steaks; an upward pivot of the handle and the upper cooking plate is stopped by the vertical sections so that oil drops formed by the thoroughly cooked steaks on the underside of the upper cooking plate are capable of flowing down from the slanted underside of the upper cooking plate to the top flat surface; and the lower hook is capable of clinging to the peripheral flange for fastening the plates together prior to storage.

In one aspect of the present invention, the horizontal section of each support comprises a flat end adjacent the vertical section and each vertical section further comprises a top protuberance having a flat lateral end so that the cooking device is operative to stand upright by resting the protuberances and the flat ends on a supporting surface. This can save storage in a storage position of the cooking device.

The above and other objects, features and advantages of the present invention will become apparent from the following detailed description taken with the accompanying drawings.

DETAILED DESCRIPTION OF THE PREFERRED EMBODIMENTS

Figure 1:
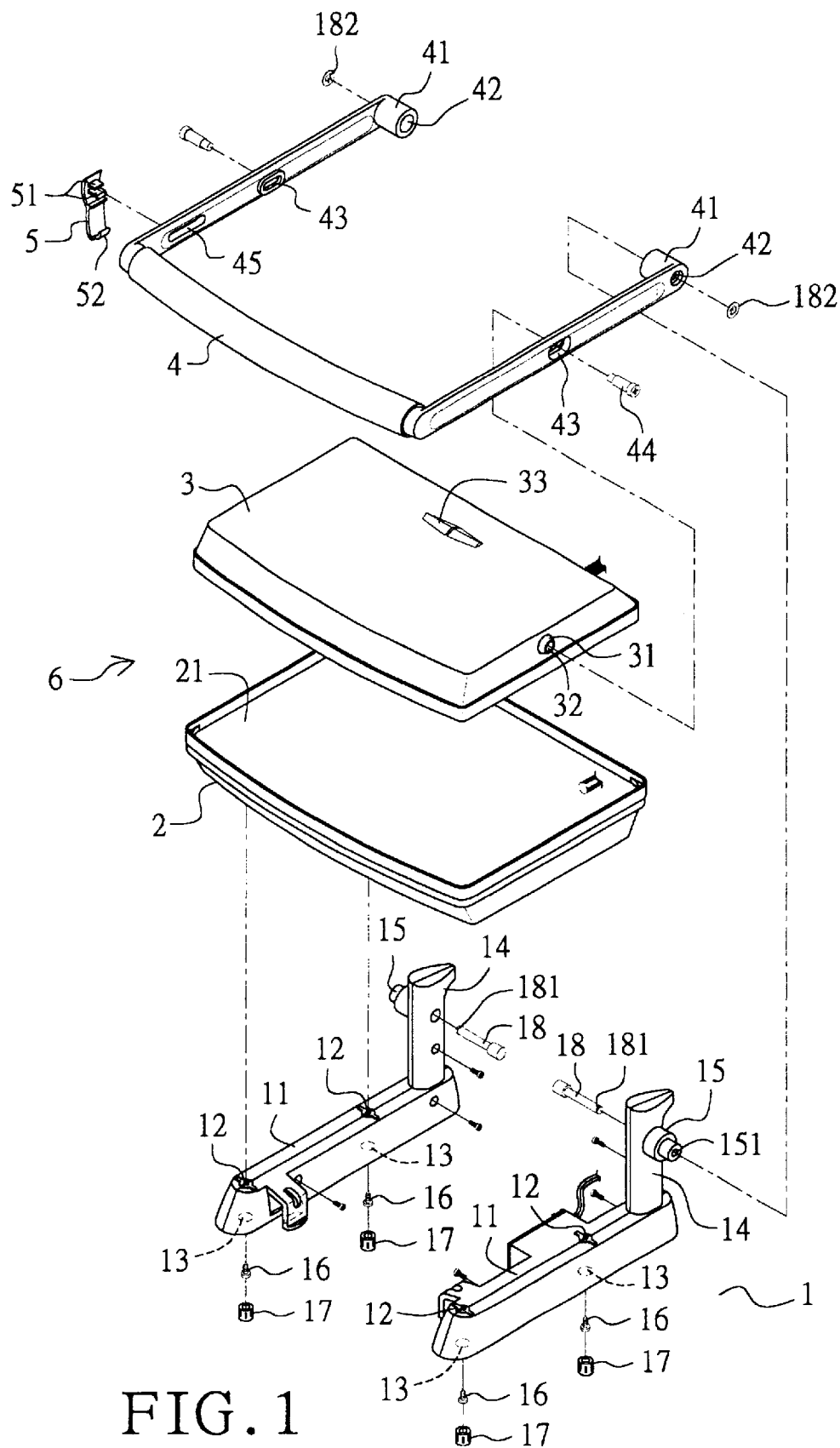
FIG. 1 is an exploded view of a preferred embodiment of a cooking device according to the invention.
Figure 2:
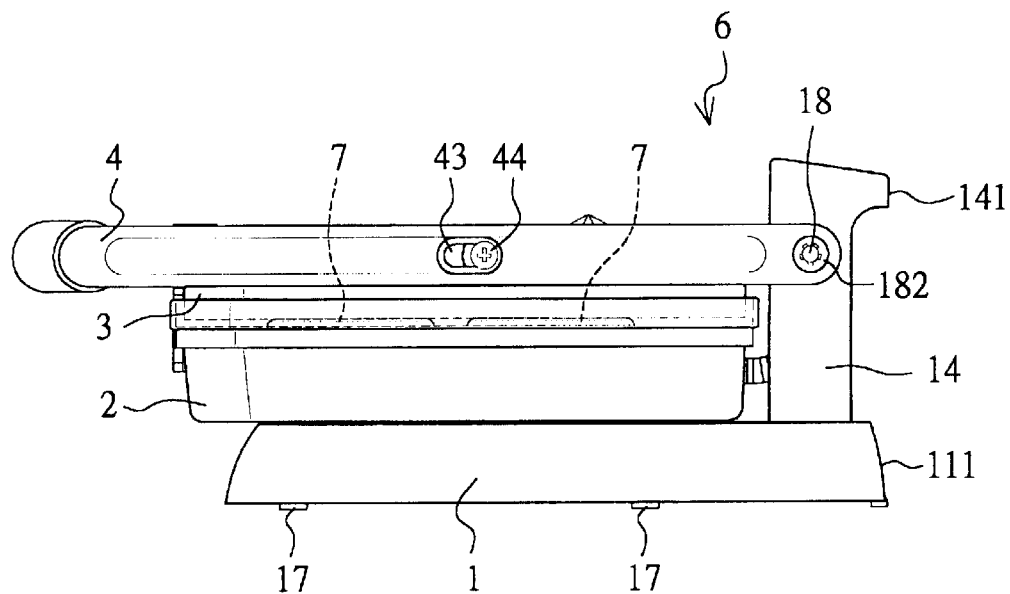
FIG. 2 is a side view of the device of FIG. 1 in a closed position schematically showing a thin steak placed between the upper and lower cooking plates.
Figure 6:
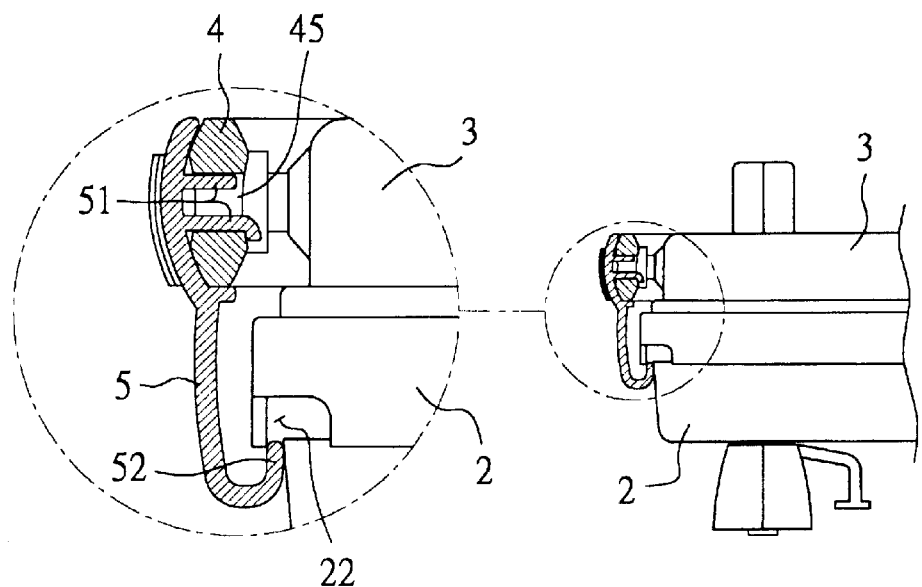
FIG. 6 is a cross-sectional view taken along line 1—1 of FIG. 5 with the fastening mechanism enlarged for showing its details.

Referring to FIGS. 1, 2, and 6, there is shown a cooking device constructed in accordance with the invention comprising two supports 1, a lower cooking plate 2, an upper cooking plate 3, a handle 4, and a flexible fastening mechanism 5. Each component is described in detail below.

The support 1 has an L shape and includes a horizontal section 11 having two top holes 12, a flat end 111 adjacent its bent point, two bottom apertures 13 so that two fasteners (e.g., screws) 13 may be driven through the apertures 13 and the holes 12 to insert into bottom holes (not shown) of the lower cooking plate 2 for fastening the support 1 and the lower cooking plate 2 together, and two glides 17 partially inserted into the apertures 13 to allow easy sliding. A vertical section 14 of the support 1 includes an outward cylindrical staged member 15 having a bore 151, and a top protuberance 141 with a flat lateral end. The lower cooking plate 2 is substantially a parallelepiped and includes a plurality of electric heating elements (not shown) embedded therein, a top flat surface 21 with a peripheral wall formed therearound and a peripheral flange 22 for enclosing the underside. The upper cooking plate 3 is also substantially a parallelepiped capable of matingly engaging with the top flat surface 21 of the lower cooking plate 2. The upper cooking plate 3 includes a plurality of electric heating elements (not shown) embedded therein, a protrusion 31 at either side, two holes 32 each through the protrusion 31, and a power indicator 33 raised above the top surface. The handle 4 is shaped as an n and includes a cylinder 41 at either end and two bores 42 each through the cylinder 41 so that the head 181 of a pivot pin 18 may be driven through the bores 151 and 42 to be secured by a clip ring 182 at the opening of the bore 42. As such, the handle 4 is pivotably secured to the supports 1. The handle 4 further includes two first elongate slots 43 each at about the center of the side and two pin-shaped sliding members 44 each loosely inserted through the first elongate slot 43 and the hole 32 with a portion of the sliding member 44 projected from the slot 43 so that the upper cooking plate 3 can be pivotal about the handle 4. The handle 4 further includes a second elongate slot 45 between one of the first elongate slots 43 and the interconnection section. The fastening mechanism 5 includes two upper latches 51 of different lengths inserted into the second elongate slot 45 for fastening the fastening mechanism 5 and the handle 4 together, and a lower hook 52.

Figure 3:
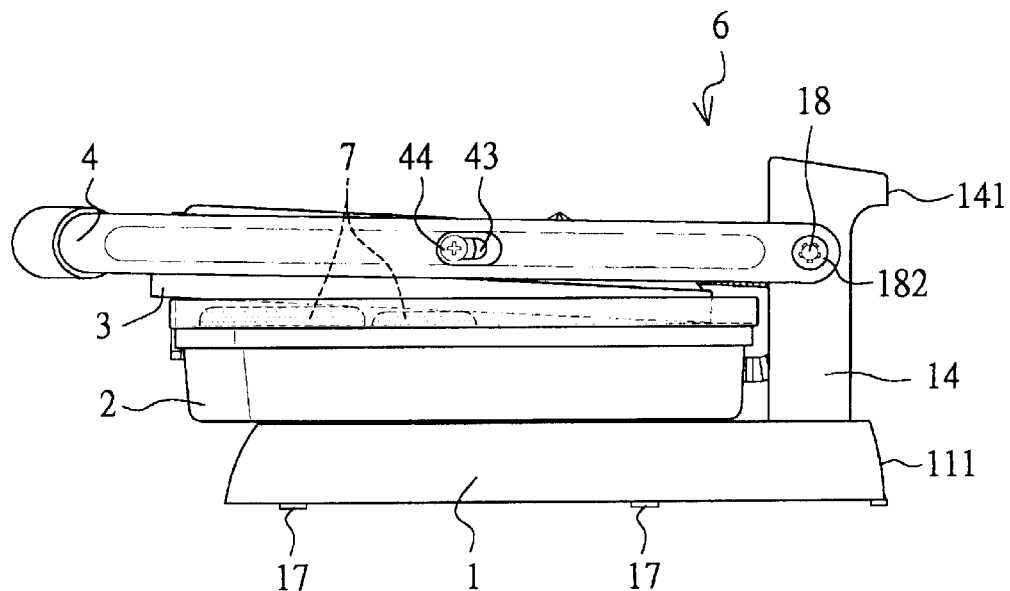
FIG. 3 is a view similar to FIG. 2 schematically showing a thick steak placed between the upper and lower cooking plates.

Referring to FIG. 2 again in conjunction with FIG. 3, an operation regarding adaptation of the invention with respect to variations in the thickness of a steak placed between the plates 2 and 3 will now be described in detail below. In FIG. 2, a number of thin steaks 7 are placed between the plates 2 and 3 with the sliding member 44 slid to the right of the slot 43 so that the underside of the upper cooking plate 3 can be in intimate contact with the steaks 7. As a result, heat can be effectively transferred from the heating elements of both plates 2 and 3 to the steaks 7. In contrast as shown in FIG. 3, a number of thick steaks 7 are placed between the plates 2 and 3. At this time, a user can slide the sliding member 44 by pushing its projected head to the left of the slot 43. This also can cause the underside of the upper cooking plate 3 to be in intimate contact with the steaks 7. Likewise, heat can be effectively transferred from the heating elements of both plates 2 and 3 to the steaks 7.

Figure 4:
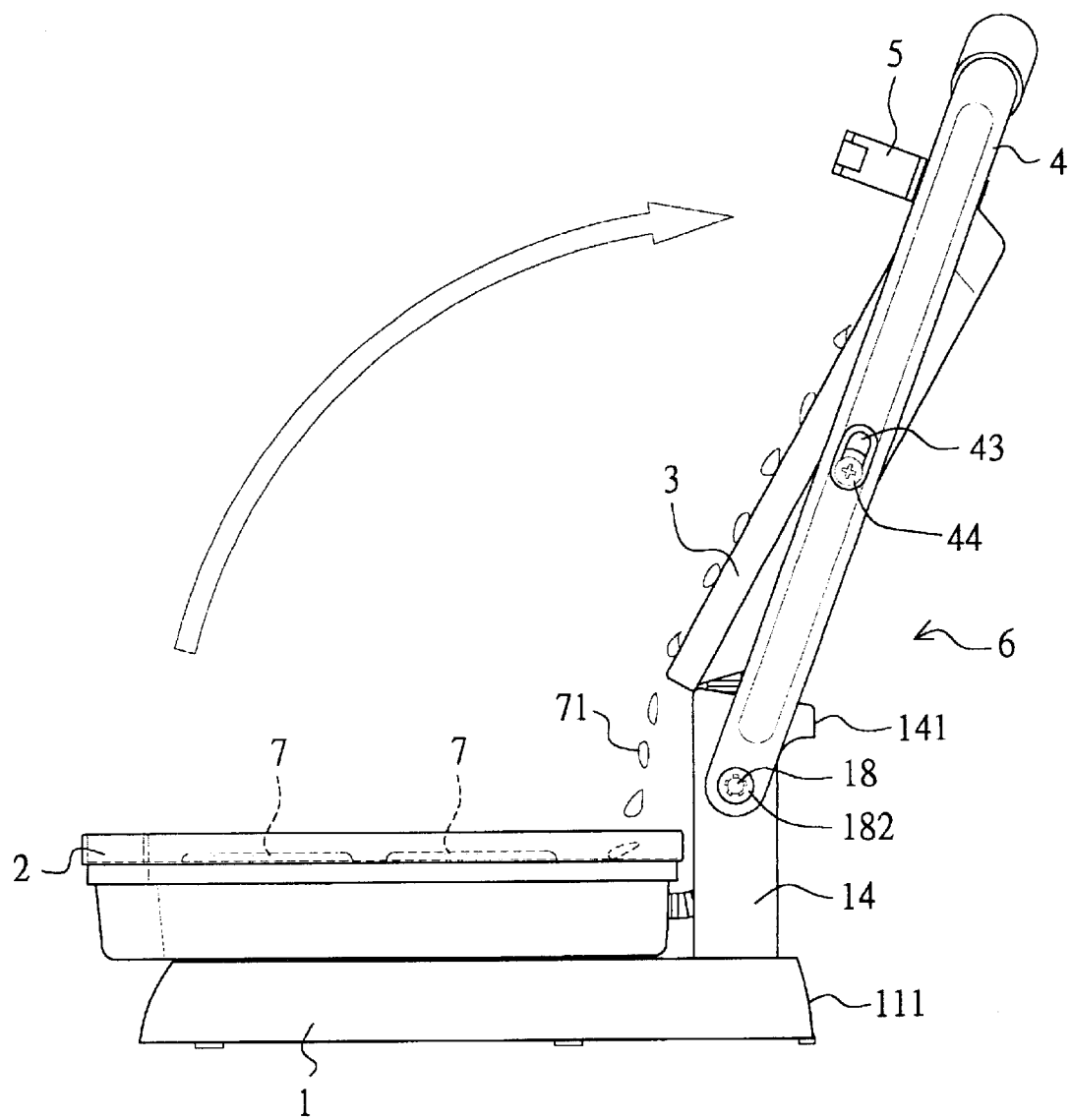
FIG. 4 is a view similar to FIG. 2 where the upper cooking plate is pivoted to open for removing the well-done steak.

Referring to FIG. 4, once the steaks 7 are thoroughly cooked the user can upwardly pivot the handle 4 and thus the upper cooking plate 3 until the upper cooking plate 3 is stopped by the vertical sections 14. At this position, the user can remove the well-done steaks 7 from the device. It is also found that oil drops 71 stuck on the underside of the upper cooking plate 3 may freely flow from the slanted surface of the underside of the upper cooking plate 3 to the top flat surface 21. As an end, the oil drops 71 are prevented from spilling out of the device to fall onto a ground or a supporting surface. This feature can keep a clean cooking environment.

Figure 5:
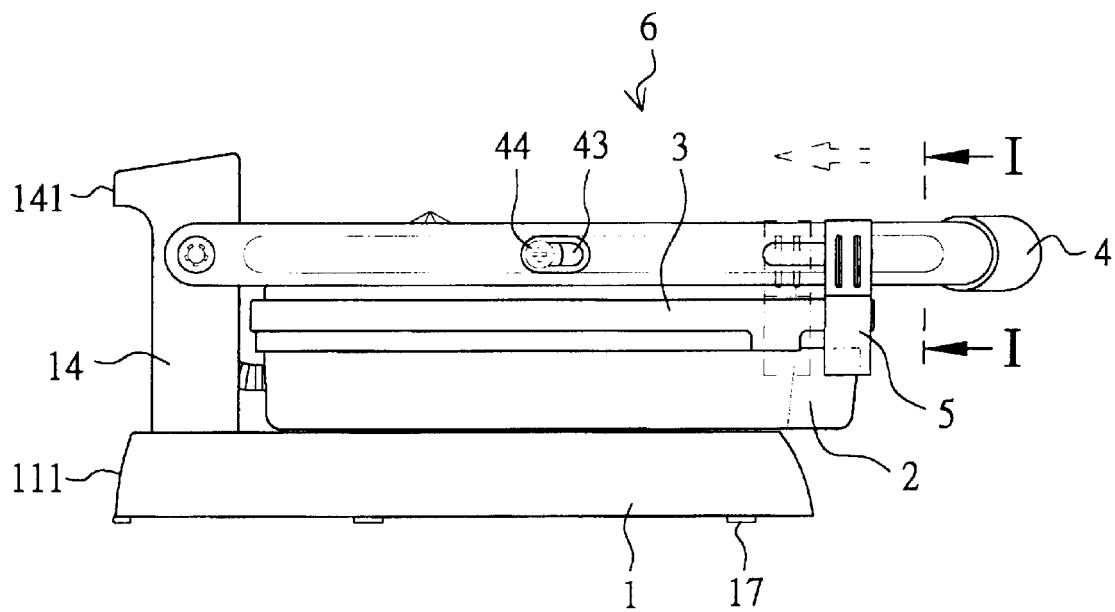
FIG. 5 is another side view of the device of FIG. 1 for showing a fastening of the device by fastening mechanism in a storage position.
Figure 7:
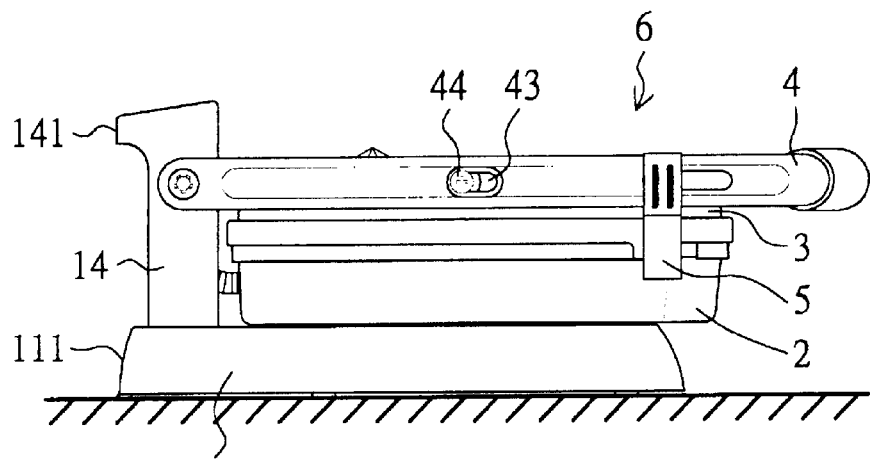
FIG. 7 is a view similar to FIG. 5 where the device is secured.

Referring to FIGS. 5, 6, and 7, a storage operation of the invention will now be described in detail below. The user may cling the lower hook 52 to the peripheral flange 22 for fastening the handle 4 and the plates 2, 3 together prior to storing it.

Figure 8:
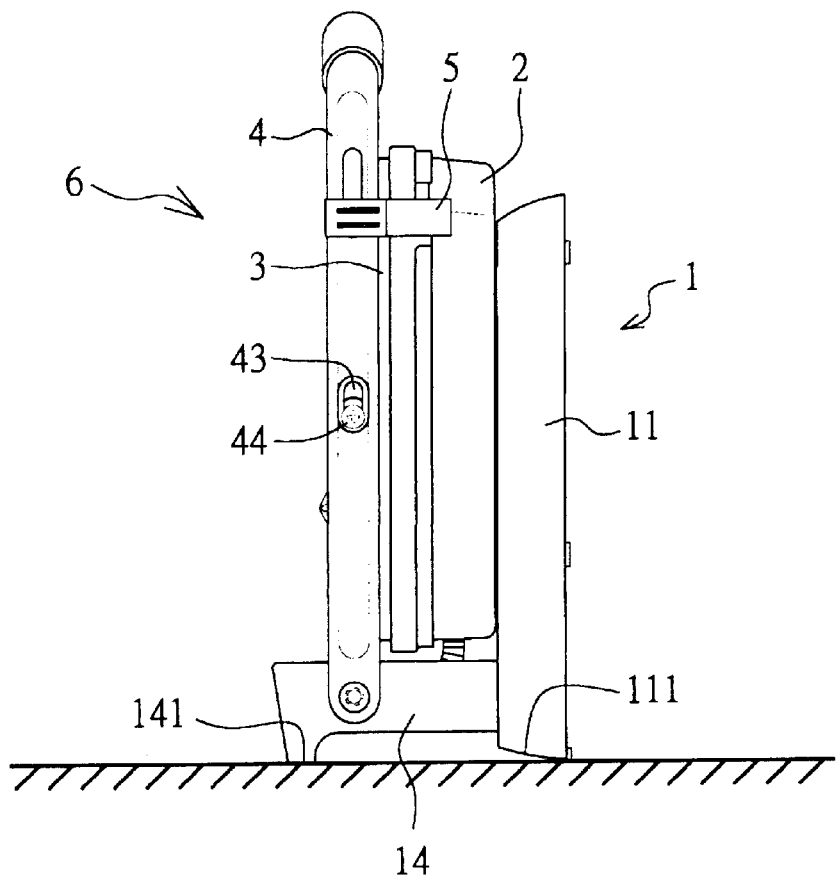
FIG. 8 is a view similar to FIG. 7 where the device is upright for reducing storage space.

Referring to FIG. 8, the user may cause the device to stand upright by turning the device about 90 degrees with respect to a supporting surface in which the protuberances 141 and the flat ends 111 are stably rested on the supporting surface. This can save storage in a storage position of the device.

While the invention has been described by means of specific embodiments, numerous modifications and variations could be made thereto by those skilled in the art without departing from the scope and spirit of the invention set forth in the claims.

What is claimed is:

1. A cooking device comprising:

two substantially L-shaped supports each including a horizontal section and a vertical section including an outward hollow, cylindrical staged member;

a lower cooking plate having a shape of parallelepiped, the lower cooking plate being releasably secured to the supports and including a plurality of electric heating elements, a top flat surface with a peripheral wall formed therearound, and a peripheral flange for enclosing its underside;

an upper cooking plate having a shape of parallelepiped, the upper cooking plate being matingly engaged with the top flat surface and including a plurality of electric heating elements and a hollow protrusion at either side;

a handle shaped as an n and including two hollow cylinders pivotably secured to the outward hollow, cylindrical staged member, two first elongate slots at the sides, two pin-shaped sliding members each loosely inserted through the first elongate slot and the hollow protrusion so as to pivotably secure the upper cooking plate to the handle, and a second elongate slot at the same side as one of the first elongate slots; and a fastening mechanism including latch means at its upper portion inserted into the second elongate slot for fastening the fastening mechanism and the handle together, and a lower hook, wherein each sliding member is either slid to one end of the first elongate slot when a plurality of thin steaks are placed between the plates or slid to the other end of the first elongate slot when a plurality of thick steaks are placed between the plates so that the underside of the upper cooking plate is capable of being in intimate contact with the steaks for effectively transferring heat from the heating elements of the plates to the steaks; an upward pivot of the handle and the upper cooking plate is stopped by the vertical sections so that oil drops formed by the thoroughly cooked steaks on the underside of the upper cooking plate are capable of flowing down from the slanted underside of the upper cooking plate to the top flat surface; and the lower hook is capable of clinging to the peripheral flange for fastening the plates together prior to storage.

2. The cooking device of claim 1, wherein the horizontal section of each support comprises a flat end adjacent the vertical section and each vertical section further comprises a top protuberance having a flat lateral end so that the cooking device is operative to stand upright by resting the protuberances and the flat ends on a supporting surface.

* * * * *